Patented June 8, 1948

2,442,865

UNITED STATES PATENT OFFICE 2,442,865

HETEROCYCLIC SUBSTITUTED PHENACYL-PYRIDINES AND METHOD OF PREPARING THE SAME

James M. Smith, Jr., North Plainfield, N. J., assignor to American Cyanamid Company, New York, N. Y., a corporation of Maine No Drawing. Application June 9, 1945,
Serial No. 598,627

9 Claims. (Cl. 260—247)

This invention relates to new organic compounds and to methods of preparing the same.

The new compounds of the present invention may be illustrated by the following general formula:

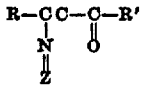

in which R is a member of the group consisting of pyridine, benzopyridine and alkylpyridine radicals, R' is an aryl radical, and the group —N=Z is a heterocyclic radical. The acid salts of these compounds are also included within the scope of the invention.

The compounds are generally characterized as being crystalline solids, the free bases being soluble in most organic solvents such as benzene, diethyl ether, isopropyl acetate, and the like, but being insoluble in water, and aqueous solutions of alkalis. The acid salts are soluble in water, aqueous solutions of acids, and alcohols but are insoluble in ether, benzene, isopropyl acetate and many other common organic solvents. Some of the compounds are of exceptional value as analgesics, whereas others are of particular value as therapeutic agents and as intermediates in the preparation of other useful organic compounds.

The compounds of the present invention may be prepared by the reaction of a heterocyclic secondary amine with an ω-halophenacyl pyridine dissolved or suspended in an anhydrous, inert organic liquid at a temperature of from about 10° C. to 70° C., preferably about 20 to 25° C. The product may be recovered as the free base or as one of its acid salts, both types of product being illustrated hereinafter in the specific examples.

Suitable ω-halophenacyl pyridines which may be used in the preparation of the new compounds include 2 - (ω - bromophenacyl)pyridine, 2 - (ω-chlorophenacyl)pyridine, 4-(ω-bromophenacyl)-pyridine, 4 - (ω - chlorophenacyl)pyridine, 2-(ω-bromophenacyl)-5,6-benzopyridine, 2-(ω-chlorophenacyl)-5,6-benzopyridine, 2 - (ω-bromophenacyl) 4,5-benzopyridine, 2-(ω-bromophenacyl) - 6 - methyl pyridine, 2 - (ω - bromophenacyl)-6-methyl pyridine, 2-(ω-bromophenacyl)-4,6-dimethyl pyridine, 2-(ω-bromophenacyl)-3-ethyl-6-methyl pyridine, and others. The aryl radical, R', may contain substituent radicals such as chlorine, bromine, methyl, methoxy, nitro carbethoxy, and the like. These compounds are new and form the subject matter of my co-pending application, Serial No. 598,626, filed June 9, 1945, now Patent No. 2,414,398, issued January 14, 1947.

The preparation of representative compounds of this group is described in some of the specific examples hereinafter.

Suitable heterocyclic secondary amines which can be reacted with the foregoing ω-halophenacyl pyridines include piperidine, piperazine, morpholine, thiomorpholine, tetrahydroquinoline, tetrahydroisoquinoline, thiazoline, pyrollidine, and others of like nature.

The reaction is preferably conducted in an anhydrous organic solvent such as benzene, diethyl ether, dibutyl ether, toluene, anisole, chlorbenzene, hexane, chloroform, isopropyl acetate, or other inert organic liquid.

Preferably, the reaction is conducted at room temperature, although it may be hastened by heating the reactants. At room temperature, or lower, the reaction may require several days for substantial completion. At refluxing temperatures the reaction may be substantially complete in one or two hours, depending, of course, upon the particular solvent used and the intermediates employed in the reaction.

As a halogen acid is formed as a result of the reaction, the acid will tend to react with the secondary amine or other alkaline materials present in the reaction mixture. These salts that are formed may be insoluble in the reaction solvent and observation of the rate of salt formation will indicate the progress of the reaction. Obviously, when no more salt is formed, the reaction may be considered completed.

The invention will now be illustrated in greater particularity by means of the following examples in which representative ω-halophenacyl pyridines are reacted with representative secondary, heterocyclic amines to produce some of the new compounds of the present invention. It will be realized, of course, that these examples are illustrative and are not intended to restrict the invention to the particular products or reaction conditions specifically described. All parts are by weight unless otherwise indicated.

Example 1

A solution of 22.4 g. 2-phenacylpyridine (Scheuing and Winterhalder to Bocheringer and Sohn, DRP 594,849, 3/22/34: Friedl. 19. 1147) in 200 cc. glacial acetic acid at 90° C. is treated with a slight excess of the theoretical two equivalents of bromine dissolved in 200 cc. glacial acetic acid, added over a period of about one hour. The temperature is maintained at 90–100° C. for about one hour longer, then the solution is cooled to room temperature and allowed to stand overnight. The next day 150 cc. of solvent is distilled off. On dilution of the residual solution with ice and water, the 2-(ω-bromophenacyl)-pyridine precipitates and is isolated by filtration. The new compound may be purified by dissolving in acetic acid, treating with activated charcoal, filtering, and diluting the filtrate with ice. It melts at 93–90° C.

10 g. of 2-(ω-bromophenacyl)pyridine in 50 cc. anhydrous benzene is treated with 8 g. piperidine and heated under reflux for about three hours. The precipitate is filtered off and consists of piperidine hydrobromide. The benzene solution is extracted twice with dilute hydrochloric acid, then twice with water. The combined aqueous extracts are made slightly alkaline and the supernatant liquor is decanted from the oil which precipitates. This oil crystallizes on standing. The crystalline product is purified by dissolving in a dilute mineral acid such as hydrochloric acid, treating with activated charcoal and clarifying. Neutralization with ammonia gives a greenish yellow solid material. When dry, the 1-phenyl-2-(2 - pyridyl) - 2 - (N-piperidyl)ethanone-1 melts about 67° C. It may be purified by crystallization in the usual manner from a suitable solvent, such as hexane or petroleum ether.

Example 2

41 g. piperidine is added to 55 g. 2-(ω-bromophenacyl)pyridine in 400 cc. dry benzene at room temperature. The reaction mixture is allowed to stand at room temperature until the reaction is complete as shown by the recovery of piperidine hydrobromide. The benzene solution after removal of piperidine hydrobromide by filtration, is extracted with dilute hydrochloride acid three times, then washed with water. Neutralization with ammonia or other alkali such as sodium hydroxide precipitates the product, which is washed by decantation and then dissolved in a suitable solvent such as ether, benzene or isopropyl acetate. This solution is dried over a suitable drying agent, such as for example, anhydrous sodium sulfate, and the 1-phenyl-2(2-pyridyl)-2-(N-piperidyl)ethanone is precipitated as its hydrochloride by the addition of alcoholic hydrogen chloride. Alternatively, the sulfate may be precipitated by addition of concentrated sulfuric acid. The salt is filtered off and dried, preferably at 50–75° C. in a current of air. The yield as the hydrochloride is about 42 g. or 66% of the theory.

The amide salt may be purified further if desired, by dissolving in water, treating with activated charcoal, filtering and precipitating the base by neutralization with ammonia. The base is washed with water, dissolved in isopropyl acetate, the solution dried, and the compound precipitated as the hydrochloride by addition of alcoholic hydrogen chloride. The hydrochloride is filtered, washed with isopropylacetate, ether, or benzene, and dried.

The amine salt may also be purified by dissolving it in absolute alcohol, treating with activated charcoal and filtering. Addition of dry ether causes precipitation of the salt.

The 1-phenyl-2-(2-pyridyl) - 2 - (N-piperidyl) ethanone hydrochloride melts about 200–220° C.; the free amine, isolated by neutralizing a water solution of the hydrochloride, melts about 67° C.

Example 3

A solution of 27.6 g. 2-(ω-bromophenacyl)pyridine in 200 cc. anhydrous benzene is treated with 19.1 g. morpholine, and the reaction mixture stirred at room temperature for 15 minutes. A heavy precipitate forms. After standing at room temperature for several days, the reaction is essentially complete as shown by recovery of the theoretical amount of crystalline morpholine hydrobromide by filtration. The filtered solution is washed with water three times and the washings discarded. The benzene solution is then extracted three times with dilute hydrochloric acid. The combined acid extracts are treated with activated charcoal and filtered. The crystalline precipitate which forms on neutralization with ammonia is isolated by filtration, washed with water and dried. This is 1-phenyl-2-(2-pyridyl)-2-(N-morpholyl)ethanone, which has a melting point of about 110–111° C.

Example 4

To a solution of 98.6 g. of 4-phenacylpyridine (A. E. Tchitchibabin, Rec. Trav. Chim. 57, 582–5 (1938)) in 375 cc. of glacial acetic acid at room temperature is added rapidly with vigorous stirring a solution of 79.9 g. of bromine in 125 cc. of glacial acetic acid. The temperature rises to 55° C. and crystals begin to form almost immediately. After standing for 45 minutes the light grey crystals of 4-(ω-bromophenacyl)pyridine hydrobromide are isolated by filtration, glacial acetic acid is removed by washing with mixed hexanes and the product is dried at 50° C. The yield of 4-(ω-bromophenacyl) pyridine hydrobromide is 178.5 g. representing 100% of the theory; the melting point is about 221° C. (decomp.). It may be crystallized from glacial acetic acid. It is stable if kept in a tightly stoppered bottle but decomposes rapidly on exposure to moisture.

While keeping the temperature at 20–25° C. by cooling with an ice bath 107.1 g. of 4-(ω-bromophenacyl)pyridine hydrobromide is added over a period of twenty minutes to a solution of 83.1 g. of dry piperidine in 600 cc. of dry benzene. The ice bath is then removed and the reaction is stirred at room temperature for forty-eight hours. The crystals of piperidine hydrobromide are removed by filtration and washed with ten portions of 25 cc. each of benzene. The benzene filtrate is extracted with 200 cc. of 2 N hydrochloric acid and then five times with 25 cc. of 2 N hydrochloric acid each time until the aqueous layer is almost colorless. The aqueous extract is made alkaline with concentrated ammonium hydroxide. The thick brown oil which precipitates is extracted with isopropyl acetate and the extract is dried over anhydrous sodium sulfate. An absolute ethanolic solution of 0.6 moles of hydrogen chloride is added with stirring. After the product crystallizes it is isolated by filtration, washed with isopropyl acetate, and dried at 50° C. The yield of 1-phenyl-2-(4 - pyridyl) - 2 - (N-piperidyl) ethanone dihydrochloride is 99.3 g. representing 93.5% of theory. It is purified by treating with activated charcoal in hot methanol, is crystallized from the filtrate by the addition of absolute ether and is dried in a vacuum oven at 50° C. The anhydrous white crystals melt gradually in the range 155 to 180° and are hygroscopic.

Example 5

By the procedure of Example 5 starting with 141.6 g. of dry morpholine and 178.5 g. of 4-(ω-bromophenacyl)pyridine hydrobromide, there is obtained 174.4 g. of crude 1-phenyl-2-(N-morpholyl)-2 - (4-pyridyl)ethanone dihydrochloride, representing 98% of the theoretical yield. The purified product is hygroscopic. After drying in a vacuum oven to a constant weight at 50° C. it melts at 100–118° and contains one-half molecule of water of crystallization.

Example 6

50 g. of 2-phenacylquinoline (Scheuing and Winterhalder to Boehringer and Sohn, D. R. P. 594,849, 3/22/34; Friedl. 19. 1147) in 1500 cc. anhydrous ether with 20 g. powdered calcium carbonate is treated with 32 g. bromine in 500 cc. absolute ether, added in about fifteen minutes. After stirring for three hours at room temperature, 50 cc. piperidine is added. Stirring is continued two hours and then the charge is allowed to stand overnight at room temperature. The next day the insoluble material is removed by filtration and washed with ether.

The ether filtrate is extracted three times with dilute hydrochloric acid. The combined acid extracts are neutralized with ammonia to give a product which is extracted with ether. The ether extracts are dried a short time over anhydrous sodium sulfate and then the amine hydrochloride is precipitated by the addition of hydrogen chloride in dry ether. The precipitate is taken up in absolute alcohol, treated with activated charcoal, clarified, cooled and diluted with ether. The crystals are filtered and dried at 50° giving pale yellow 1 - phenyl - 2 -(N-piperidyl)-2-(2-quinoleyl) ethanone hydrochloride. This may be further purified by dissolving in absolute alcohol at 75° C., treating with a little activated charcoal, and after clarifying, diluting with absolute ether. The crystalline precipitate is filtered off, washed with ether and dried at 50–55° C. The purified product melts at about 223° C.

Example 7

A solution of 45 g. 4-styrylquinoline hydrochloride in 350 cc. boiling chloroform is treated with 25 g. bromine in 50 cc. chloroform. After about thirty minutes' boiling, precipitation begins; gentle refluxing on the warm water bath is continued for one hour. The charge is cooled and the product is collected on the filter. It is dried at about 50° C. The yield of dibromo-4-styrylquinoline hydrochloride is 63 g. It melts with decomposition at about 190° C.

Treatment of 44.4 g. of dibromo-4-styrylquinoline hydrochloride with 88 g. potassium hydroxide in 800 cc. hot alcohol gives 22 g. phenyl-4-quinolylacetylene; boiling point 205–210° C. at 3 mm.

A solution of 15 g. phenyl-4-quinolylacetylene in 1,000 cc. 65% sulfuric acid is boiled five minutes. On cooling, dilution, and neutralization with ammonia there is obtained 16 g. 4-phenacylquinoline; melting point about 114° C.

A solution of 10 g. 4-phenacylquinoline in 100 cc. glacial acetic acid is treated with a slight excess of the theoretical amount of bromine in 25 cc. glacial acetic acid, which is added at 20–25° C. in about fifteen minutes. After standing at room temperature for several hours, the solution is treated with a little activated charcoal and filtered. The filtrate is diluted with water to about one liter of solution, and the precipitate is collected on the filter. It is then washed with water, wet with a volatile solvent such as mixed hexanes, or isopropylacetate, and dried at about 50° C. The yield of ω-bromo-4-phenacylquinoline is 10 g.; melting point about 115–120° C.

A slurry of 10 g. ω-bromo-4-phenacylquinoline in 100 cc. dry benzene is treated with 10 cc. piperidine, and the solution is stored at room temperature until the reaction is complete as shown by recovery of the theoretical amount of piperidine hydrobromide. The benzene solution after filtering is extracted several times with dilute hydrochloric acid until the acid extracts remove no more product. The combined aqueous acid extracts are then neutralized with ammonia. The semi-solid material which precipitates is taken up in ether and the ether solution is dried a short time over sodium sulfate. After filtration, 1-phenyl-2-(N-piperidyl)-2-(4 - quinolyl) ethanone dihydrochloride is precipitated from the ether solution by the addition of dry hydrogen chloride in alcohol. The crude material is purified by dissolving it in alcohol, treating with activated charcoal, clarifying, and precipitating with ether. It is collected on the filter, washed with ether, and dried.

Example 8

To a solution of 46.5 parts by weight of dry piperidine in 1150 parts by weight of dry benzene is added with cooling and stirring, one hundred parts by weight of 4-(ω-bromo-o-carbethoxyphenacyl)pyridine hydrobromide. Some cooling is necessary to keep the temperature between 15–20° C. The slurry is stirred for 24 hours and the piperidine hydrobromide is removed by filtration. The press cake is washed with additional benzene and the washings combined with the original filtrate. The product is now isolated from the benzene solution by extracting with an excess of the equivalent amount of dilute hydrochloric acid. The free base of the product is then liberated by neutralizing the solution of the hydrochloride with ammonium hydroxide. The base which precipitates is separated by decanting the water and then dissolved in warm isopropyl acetate. This solution of the base is dried and then the dihydrochloride of the product is precipitated by the addition of alcoholic HCl. The product, 2 - (N - piperidyl) - 2-(4-pyridyl)-1-(2-carbethoxyphenyl)ethanone dihydrochloride, is separated and washed with an organic solvent and dried.

Example 9

A solution of 11 g. ω-chloro-2-phenacylpyridine in 100 cc. dry benzene is treated with 11 g. piperidine. After 48 hours standing at room temperature, the piperidine hydrochloride is removed by filtration. The benzene solution is extracted three times with dilute hydrochloric acid, then washed with water. From the combined aqueous acid solution on neutralization with ammonia, the 2-(N-piperidyl)-2-(2-pyridyl)phenylethanone is obtained.

What I claim is:

1. Compounds having the general formula

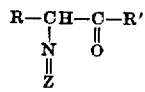

and acid salts thereof, in which R is a member of the group consisting of pyridine, benzopyridine, and alkylpyridine radicals, R' is an aryl radical, and the group —N=Z a heterocyclic radical.

2. Compounds having the general formula

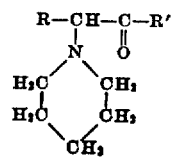

in which R is a member of the group consisting of pyridine, benzopyridine, and alkylpyridine radicals and R' is an aryl radical.

3. Compounds having the general formula

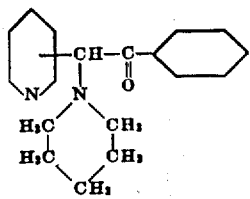

4. 1-phenyl-2-(4-pyridyl)-2-(N-piperidyl)ethanone.
5. 1-phenyl-2-(2-pyridyl)-2-(N-morpholyl)-ethanone.
6. 1-phenyl-2-(N-piperidyl)-2-(2-quinolyl)-ethanone hydrochloride.
7. A method of preparing compounds having the general formula

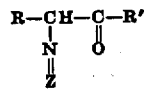

in which R is a member of the group consisting of pyridine, benzopyridine, and alkylpyridine radicals, R' is an aryl radical and the group —N=Z is a heterocyclic radical which comprises mixing together in an inert anhydrous organic liquid a compound having the formula

in which X is a halogen and R and R' are as defined, and a secondary heterocyclic amine.

8. A method of preparing compounds having the general formula

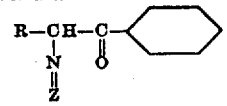

in which R is a member of the group consisting of pyridine, benzopyridine, and alkylpyridine radicals and the group —N=Z is a heterocyclic radical which comprises mixing together in an inert anhydrous organic liquid a compound having the formula

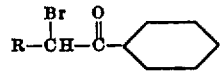

in which R is as defined, and a secondary heterocyclic amine.

9. A method of preparing compounds having the general formula

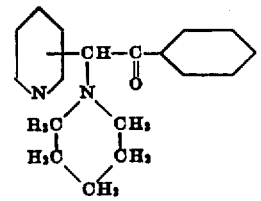

which comprises mixing together in an inert anhydrous organic liquid a compound having the formula

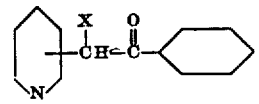

in which X is a halogen, and piperidine.

JAMES M. SMITH, Jr.

---

Certificate of Correction

Patent No. 2,442,865.      June 8, 1948.

JAMES M. SMITH, Jr.

It is hereby certified that errors appear in the printed specification of the above numbered patent requiring correction as follows: Column 1, line 6, in the formula, for "CC" read *CH*; column 3, line 7, for "90° C." read *94° C.*; line 36, for the word "hydrochloride" read *hydrochloric*; line 52, for "amide" read *amine*; and that the said Letters Patent should be read with these corrections therein that the same may conform to the record of the case in the Patent Office.

Signed and sealed this 17th day of August, A. D. 1948.

[SEAL]

THOMAS F. MURPHY,
*Assistant Commissioner of Patents.* in which R is a member of the group consisting of pyridine, benzopyridine, and alkylpyridine radicals and R' is an aryl radical.

3. Compounds having the general formula

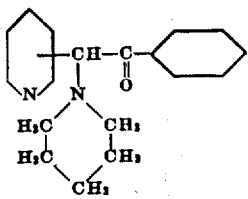

4. 1-phenyl-2-(4-pyridyl)-2-(N-piperidyl)ethanone.
5. 1-phenyl-2-(2-pyridyl)-2-(N-morpholyl)-ethanone.
6. 1-phenyl-2-(N-piperidyl)-2-(2-quinolyl)-ethanone hydrochloride.
7. A method of preparing compounds having the general formula

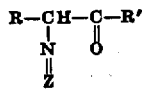

in which R is a member of the group consisting of pyridine, benzopyridine, and alkylpyridine radicals, R' is an aryl radical and the group —N=Z is a heterocyclic radical which comprises mixing together in an inert anhydrous organic liquid a compound having the formula

in which X is a halogen and R and R' are as defined, and a secondary heterocyclic amine.

8. A method of preparing compounds having the general formula

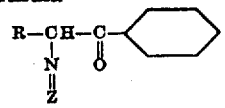

in which R is a member of the group consisting of pyridine, benzopyridine, and alkylpyridine radicals and the group —N=Z is a heterocyclic radical which comprises mixing together in an inert anhydrous organic liquid a compound having the formula

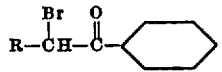

in which R is as defined, and a secondary heterocyclic amine.

9. A method of preparing compounds having the general formula

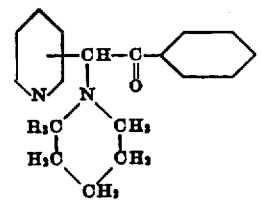

which comprises mixing together in an inert anhydrous organic liquid a compound having the formula

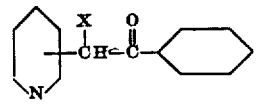

in which X is a halogen, and piperidine.

JAMES M. SMITH, JR.

Certificate of Correction

Patent No. 2,442,865.  June 8, 1948.

JAMES M. SMITH, JR.

It is hereby certified that errors appear in the printed specification of the above numbered patent requiring correction as follows: Column 1, line 6, in the formula, for "CC" read *CH*; column 3, line 7, for "90° C." read *94° C.*; line 36, for the word "hydrochloride" read *hydrochloric*; line 52, for "amide" read *amine*; and that the said Letters Patent should be read with these corrections therein that the same may conform to the record of the case in the Patent Office.

Signed and sealed this 17th day of August, A. D. 1948.

[SEAL]

THOMAS F. MURPHY,
*Assistant Commissioner of Patents.*